United States Patent [19]

Shuey

[11] Patent Number: 4,746,897

[45] Date of Patent: May 24, 1988

[54] APPARATUS FOR TRANSMITTING AND RECEIVING A POWER LINE

[75] Inventor: Kenneth C. Shuey, Raleigh, N.C.

[73] Assignee: Westinghouse Electric Corp., Pittsburgh, Pa.

[21] Appl. No.: 35,255

[22] Filed: Apr. 2, 1987

Related U.S. Application Data

[63] Continuation of Ser. No. 575,125, Jan. 30, 1984, abandoned.

[51] Int. Cl.$^4$ ............................................. H04M 11/04
[52] U.S. Cl. .................................. 340/310 R; 328/171; 328/175
[58] Field of Search ................. 340/310 R, 310 A; 328/163, 167, 168, 169, 171, 175; 333/173, 176; 379/66

[56] References Cited

U.S. PATENT DOCUMENTS

| | | | |
|---|---|---|---|
| 2,342,787 | 2/1944 | Brown | 340/825.06 |
| 2,883,459 | 4/1959 | Roy | 179/2.51 |
| 2,936,367 | 5/1960 | Kobetich | 455/84 |
| 3,495,217 | 2/1970 | Brooks | 375/7 |
| 4,204,194 | 5/1980 | Bogacki | 340/310 A |
| 4,270,206 | 5/1981 | Hughes | 340/310 A |
| 4,323,882 | 4/1982 | Gajjar | 360/310 R |
| 4,355,303 | 10/1982 | Phillips et al. | 340/310 A |
| 4,399,547 | 8/1983 | Moore et al. | 340/310 A |
| 4,451,853 | 5/1984 | Moriguchi et al. | 340/310 A |

Primary Examiner—Douglas W. Olms
Assistant Examiner—Frank M. Scutch, III
Attorney, Agent, or Firm—G. E. Hawranko

[57] ABSTRACT

A transceiver provides a relatively constant output voltage from its linear amplifier by providing both current and voltage feedback to its operational amplifier. The present invention utilizes common components for both transmitting and receiving and provides an apparatus which can both transmit and receive power line carrier signals which can be used to communicate digital data through phase modulation of the carrier signal. The transceiver of the present invention can be operatively connected to a microprocessor through appropriate filtering and switching.

11 Claims, 3 Drawing Sheets

APPARATUS FOR TRANSMITTING AND RECEIVING A POWER LINE

This application is a continuation of application Ser. No. 575,125 filed Jan. 30, 1984, now abandoned.

BACKGROUND OF THE INVENTION

The present invention relates generally to an apparatus for the transmission and reception of power line carrier signals and, more particularly, to an apparatus that has common components which cooperate to both transmit and receive modulated carrier frequencies.

The superimposition of carrier signals on power lines for the purpose of communicating digital data from one location to another is a technique that is known to those skilled in the art. When a particular communication station, within a carrier signal communications network, is intended to both receive and transmit modulated signals, that station is usually provided with separate transmitting and receiving circuits. When, for purposes of size or cost reduction, the transmitter and receiver are designed to utilize common components, conventional linear audio amplifier techniques are generally avoided because of the assumption that the use of these techniques would be too costly in the design of a transmitter for power-line communications.

U.S. Pat. No. 4,323,882, which issued to Gajjar on Apr. 6, 1982, discloses an apparatus and method for inserting carrier frequency signal information on a distribution transformer's primary winding. It provides power line carrier frequency signals at the distribution transformer's primary winding by controlled current injection onto the neutral and phase conductors of the distribution transformer is secondary winding. The resulting carrier signal can then be modulated, by any one of a number of known methods, to communicate digital data along the power lines to a receiver at a remote location. U.S. Pat. No. 2,883,459, which issued to Roy on Apr. 21, 1959, discloses a carrier current intercommunication system which utilizes a circuit arrangement that acts both as a transmitter and a receiver. Similarly, U.S. Pat. No. 2,342,787, which issued to Brown on Feb. 29, 1944, provides a carrier current transmission system which utilizes circuit arrangements for the transmitter and receiver which are simple and low cost.

U.S. Pat. No. 3,495,217, which issued to Brooks on Feb. 10, 1970, discloses an integrated semiconductor circuit for both transmitting and receiving digital information. This particular invention combines its transmission and reception circuitry in one unit which is capable of transmitting and receiving pulse information on a transmission line. U.S. Pat. No. 2,936,367, which issued to Kobetich on May 10, 1960, discloses a transceiver which is capable of acting as an amplifier under one set of conditions and functioning as a detector under another set of conditions.

It is advantageous for a transceiver to be small in size and low in cost while also being able to reliably perform its functions. A significant reduction in the transceiver's size and cost also permits its inclusion in various apparatus which, themselves, are relatively small such as electric power meters intended for use in private residences.

SUMMARY OF THE INVENTION

The present invention relates generally to power line carrier communications and, more particularly, to an apparatus which is coupled to the secondary winding of a distribution transformer for purposes of transmission and reception of carrier signals which are superimposed on the power line current frequency.

The present invention makes it possible to use audio linear amplifier technology in a cost-effective manner while providing proper operation over a wide range of distribution transformer secondary winding impedances. Furthermore, the present invention makes possible the use of output coupling circuits of a transmitter for detecting and receiving incoming communication signals. The present invention functions both as a transmitter and as a receiver and utilizes circuit components in common for both purposes.

A preferred embodiment of the present invention incorporates current feedback techniques and provides a high DC source impedance to maintain a nearly constant output power signal for communication. The current feedback technique uses series resonant linear output coupling circuits to determine current magnitudes for purposes of current limiting. The DC power supply of the present invention is particularly designed with significant winding resistance in its transformer in order to cause the DC voltage to diminish, or "droop", as the load is increased. The cooperative association of the current limiting circuitry and the DC diminution provide a nearly constant power output signal for a wide range of load impedances while minimizing the internal heat load on the output transistors of its transmitter.

The present invention incorporates a linear amplifier which comprises an operational amplifier and a plurality of transistors with associated components. The linear amplifier takes a carrier frequency input signal and develops an increased power level output signal which is then superimposed onto the secondary winding of a distribution transformer. The operational amplifier is cooperatively associated with a plurality of resistors which ensures that the DC output voltage remains at a magnitude which is generally equal to one-half of the DC supply voltage.

The present invention, also maintains a generally constant ratio of transmitter output voltage to transmitter input voltage in the absence of output current. Its transmitter input voltage is a high quality sinusoid of fixed frequency and generally constant magnitude which can be generated by various types of linear preamplifiers. This type of linear amplifier design technology is well known to those skilled in the art.

Output coupling components which comprise capacitive and inductive elements are utilized in the present invention to provide a relatively high 60 Hz impedance and be series resonant with the capacitor at typical carrier frequencies, which generally range from 6 to 20 kHz, in order to offer a low series output impedance to the carrier signal.

The present invention utilizes a signal which is developed across an inductor of the coupling network in order to provide a protective means for limiting current without requiring significant complexity. This current feedback signal can be used because the distribution transformer secondary load impedance in this type of application is known to be primarily an inductive reactance at carrier frequencies, which are approximately 12.5 kHz, for a wide range of impedance magnitudes. A feedback signal which is approximately 180° out-of-phase with the sinusoidal input signal results by utilizing the voltage which is developed across an inductive element which is in series with the output current of the transformer. By a judicious selection of resistive and capacitive elements, a current feedback can be used to reduce the output voltage as the output current increases. For this reason, a relatively constant output current is achieved for relatively large variations of load phase angle and magnitude.

A DC voltage is provided by a conventional full-wave rectifier configuration of diodes cooperatively associated with the secondary of a transformer. The present invention utilizes a transformer whose secondary winding has sufficient impedance to allow the DC voltage to diminish, or "droop", as the output power is increased. This DC voltage is designed to be just outside the peak-to-peak AC signal swing in order to reduce the power dissipation of the output transistors.

Since it is known in the art that severe line voltage surges can occur during lightning storms or other transient conditions, it is common to design circuits which utilize relays to isolate the transmitter and protect the associated coupling components. The present invention uses this type of relay, but also uses such a relay to provide a receiver input signal and to minimize the transients which can occur during switching from the receive to the transmit position of the relay.

The present invention incorporates capacitive and inductive coupling components which are used to receive as well as transmit carrier signals. In this type of circuit configuration, the reception voltage is referenced to a receiver ground and protective buffering is provided for the receiver circuitry during transient conditions. The present invention also eliminates the duplication of 60 Hz decoupling components such as those used in known circuits.

The present invention provides an apparatus which utilizes common components to receive and transmit carrier signals that are superimposed on power-line frequencies. It also utilizes commercially available components and reduces both the size and the cost of the transmission and reception circuitry.

BRIEF DESCRIPTION OF THE DRAWINGS

The present invention will be more fully understood by reading the detailed description of the preferred embodiment in conjunction with the Figures, in which.

DESCRIPTION OF THE PREFERRED EMBODIMENT

The present invention relates to the transmission and reception of carrier signals which are modulated to convey digital data on transmission lines and comprises electronic circuitry which enables it to operate both as a receiver and a transmitter, using components in common for these two functions.

Figure 1:
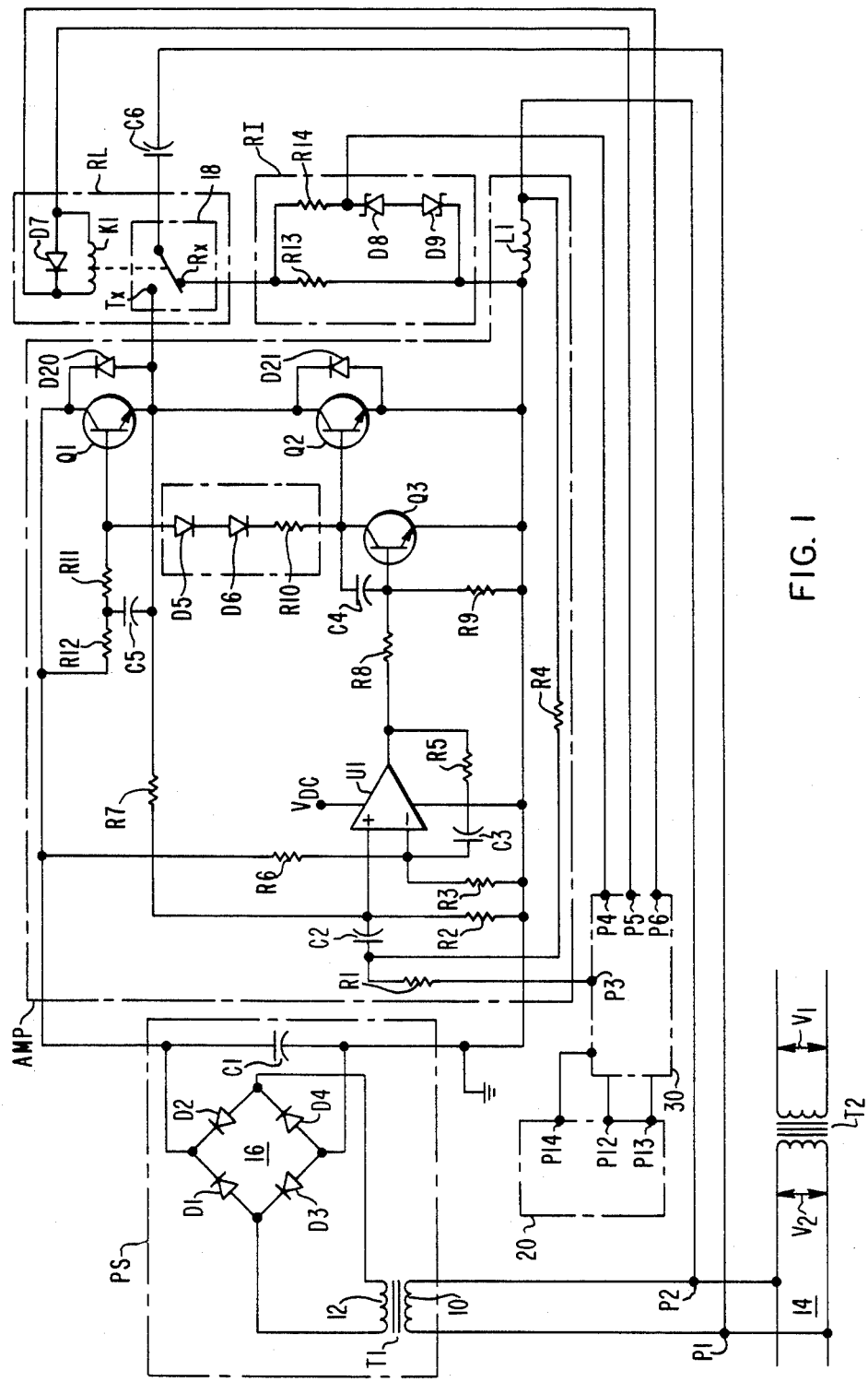
FIG. 1 illustrates a circuit which embodies the concept of the present invention.

Throughout the description of the preferred embodiment, like reference numerals will be used to identify like components in the Figures. In FIG. 1, the electronic circuit of the present invention is illustrated.

The present invention, as illustrated in FIG. 1, utilizes a transformer T1 which has a primary winding 10 and a secondary winding 12. The primary winding 10 of transformer T1 is connected across a power line system 14 in such a way that an AC voltage is developed across the primary 10. In a typical application, the connection as shown in FIG. 1 would develop 240 volts AC across the primary winding 10 of the transformer T1. In the illustration of FIG. 1, the power line system 14 is that of an electrical power consumer such as a customer's residence. The consumer's electric power, which, as stated above, is 240 volts AC, is provided by the secondary of a transformer T2. The transformer T2 is generally the type which is pole mounted and is dedicated to the provision of electric power for the residence. In typical applications, a high voltage $V_1$ is stepped down to a lower voltage $V_2$ for use by the residence. This secondary voltage, $V_2$ is the 240 volts AC which is utilized at the primary 10 of transformer T1 of the present invention. In a typical application, the transformer T2 would step the high voltage $V_1$ down from 13,200 volts AC to a secondary voltage $V_2$ of 240 volts AC which would provide the voltage potential between points P1 and P2.

The secondary winding 12 of the transformer T1 is connected to a full-wave rectifier 16 as shown. The full-wave rectifier 16 comprises four diodes, D1, D2, D3 and D4 connected in a conventional rectifier circuit as shown.

The transformer T1 serves to reduce the voltage level from the power line voltage $V_2$ of 240 volts AC, as indicated by points P1 and P2, to 65 volts AC across its secondary winding 12. The full-wave rectifier 16 converts this AC voltage to a DC voltage of 90 volts across capacitor C1. The transformer T1 can typically be a 20–30 VA transformer.

The present invention uses an operational amplifier U1 in cooperation with transistors Q1, Q2 and Q3, to form a linear amplifier circuit. Transistors Q1 and Q2 can each alternatively be replaced by a Darlington pair, or Darlington amplifier, which consists of the well known association of two transistors with their collectors tied together and the emitter of the first transistor directly coupled to the base of the second transistor. The use of Darlington pairs would provide a high input impedance and a high degree of amplification.

The operational amplifier U1, in conjunction with transistors Q1, Q2 and Q3, is capable of taking a carrier frequency input signal and developing an increased power level output signal for driving into the secondary winding 12 of the distribution transformer T1. The operational amplifier U1 combines the signals from resistors R3 and R6, which are connected to its inverting input, with the signals from resistors R2 and R7, which are connected to its non-inverting input, in order to ensure that the transmit (Tx) output voltage in always equal to approximately one-half of the magnitude of the supply voltage. This is done to maximize the amount of AC output voltage swing available to transistors Q1 and Q2.

Resistors R1, R2 and R7, in conjunction with capacitor C2, define a group of input sensing currents which are used to maintain a constant ratio between the Tx output voltage and the transmitter input voltage in the absence of any output current. Capacitor C6 and inductor L1 are utilized as output coupling components. The capacitor C6 provides a relatively high 60 Hz impedance and the size of the inductor L1 is chosen to be series-resonant with the capacitor C6 at the carrier frequency to provide a low series output impedance to the carrier signal.

The present invention utilizes the signal which is developed across the inductor L1 of the coupling network to provide a simple, but effective, means for protectively limiting the current. This technique is made possible by the fact that the load impedance of the secondary winding 12 of the distribution transformer T1 is primary an inductive reactance at expected carrier frequency magnitudes of approximately 12.5 kHz. This is true for the total range of transformers known at this time. By utilizing the voltage which is developed across the inductor L1, a signal which is approximately 180° out-of-phase with the input signal is provided. By properly selecting the values of resistors R1, R2, R4 and R7 and capacitor C2, a current feedback signal is created which reduces the output voltage as the output current increases. This current feedback flows between the inductor L1 and the non-inverting input of the operational amplifier U1, through resistor R4 and capacitor C2. Therefore, a relatively constant output current is achieved for large variations of load phase angle. A voltage feedback is provided through resistor R7. Therefore, it can be seen that the operational amplifier U1 is provided with both a voltage and a current feedback along with a minor loop feedback through resistor R5 and capacitor C3.

The present invention is inherently current limiting because of the voltage developed across inductor L1. This provides a current limiting signal because, since the load is primarily inductive, the signal developed across the inductor L1 has a proper phase relationship so that it can be utilized as a current feedback for the operational amplifier U1, through resistor R4, to subtract from the input. Because the present invention uses the isolation of transformer T1 to generate a floating DC supply which is referenced to one side of the 240 volt AC input, it can be connected directly to the power line. The current limiting, which is discussed above, and the use of the relay 18 in the design of the present invention aid in matching the amplifier to the wide range of input conditions which result from the direct connection of the present invention to the power line. Therefore, the present invention enables the output of its amplifier to be connected directly to the power line 14 instead of requiring that it be isolated from the line. This is an important characteristic of the present invention because it eliminates the need for output transformers.

The present invention utilizes a switch 18 to change the circuitry from the receiving mode (Rx) to the transmit mode (Tx) and vice versa. The switch 18 is operated by a relay coil K1, with diode D7 being connected in parallel with it, and the relay acts in response to signals from a microprocessor 20. The microprocessor 20, or any other device which is cooperatively associated with the present invention, would operate the switch 18 by appropriately altering the voltage across points P5 and P6.

It should be understood that, although the present invention would most likely be utilized in cooperation with a microprocessor 20, the precise characteristics and capabilities of the microprocessor 20 are not directly related to the present invention since the present invention is designed to serve as a transmitter and receiver independently from the particular capabilities of the microprocessor 20. In the typical situation where the present invention is used in cooperation with a microprocessor 20, a suitable microprocessor would be a Motorola 6801 microprocessor with on-board read-only memory (ROM) and rapid access memory (RAM) along with programmable input and output ports which are used for communications.

Figure 2:
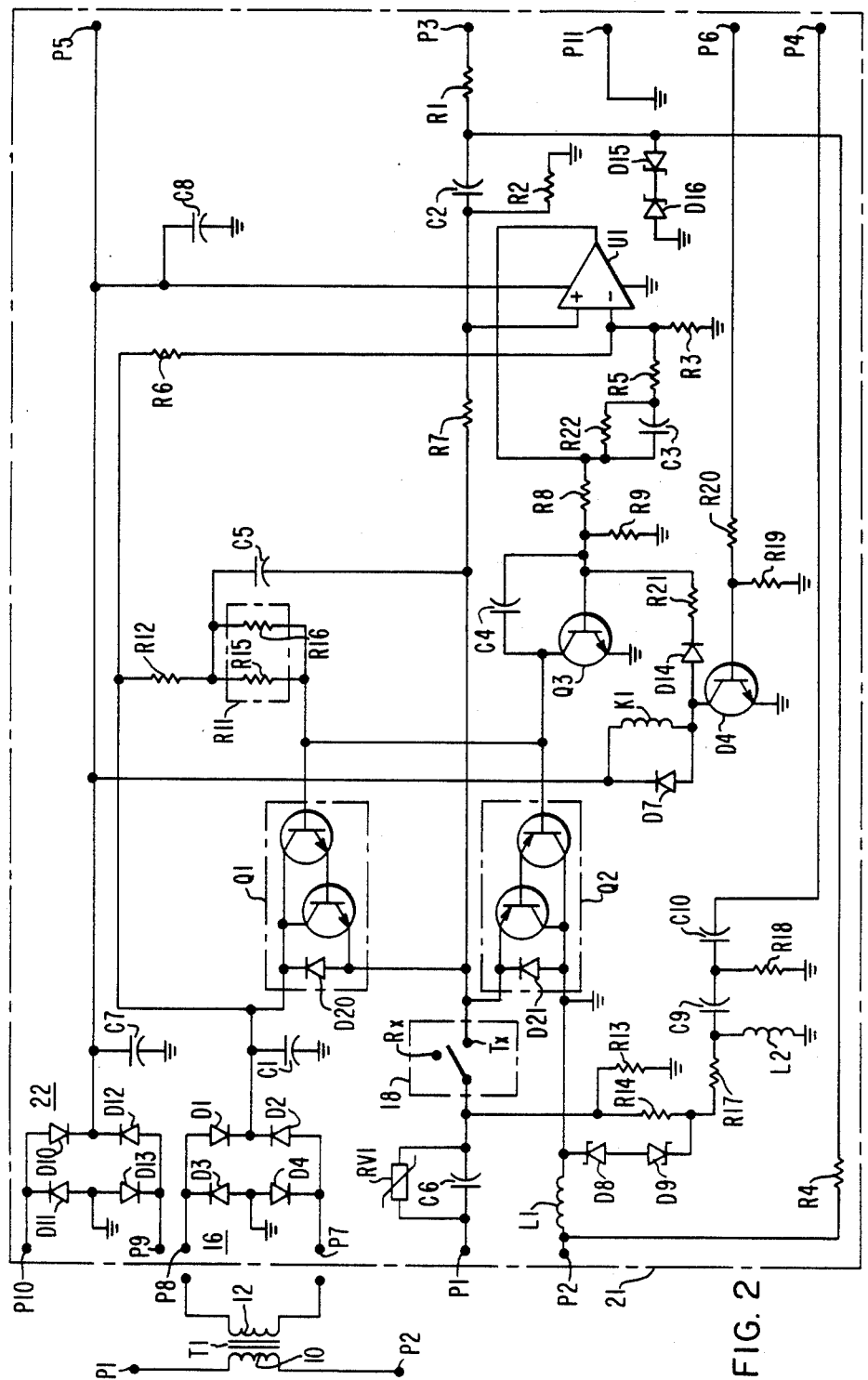
FIG. 2 illustrates a detailed electronic circuit in a particular preferred embodiment of the present invention.

When the switch 18 is in a receiving state (i.e. connected to Rx), resistor R13 is connected to capacitor C6 and inductor L1, as shown in FIG. 1. Therefore, resistor R13 acts as a very small resistance in comparison to the 60 Hz impedance of capacitor C6. As an example, resistor R13 may be approximately 100 ohms while capacitor C6 may act in the circuit as a 1000 ohm reactive capacitor with these two components being in quadrature relationship with each other. Therefore, there would be essentially 240 volts AC across the capacitor C6 at all times. When the switch 18 is moved from the Rx position to the Tx position, the voltage change across capacitor C6 would only be the difference in voltage between the voltage across resistor R13 and the instantaneous output voltage of the amplifier. This would generally result in less than 30 volts being picked up across capacitor C6. As a result, the transient would be much smaller than the alternative situation where the capacitor completely discharged and then had to apply 240 volts AC to the capacitor C6. Therefore, the present invention provides transient protection for the components of its transceiver. As will be discussed below, the embodiment of the present invention which is illustrated in FIG. 2 differs slightly from that shown in FIG. 1. One specific distinction between these two illustrations of the present invention is in the connection of resistor R13. The configuration illustrated in FIG. 2 shows the resistor R13 as being permanently connected to capacitor C6 even when the present invention is not in the Rx position. This distinction will be discussed in greater detail below.

As illustrated in FIG. 1, two diodes, D5 and D6, and a resistor R10 are shown connected in series between the bases of transistors Q1 and Q2. These components are used for linear biasing in order to reduce distortion in the output wave form. It should be understood that these components, which are shown in FIG. 1, are not present in the circuit of FIG. 2, which will be discussed below. These linear biasing components, although helpful in reducing distortion, can possible introduce disadvantageous thermal sensitivity. By comparison, the similar portion of the circuit illustrated in FIG. 2 connects the bases of transistors Q1 and Q2 directly together and eliminates the use of these linear biasing components in order to achieve better thermal capabilities of the overall circuit. It should be understood that either alternative configuration, as well as any other known biasing technique, is within the scope of the present invention.

The operational amplifier U1 is shown in FIG. 1 having a connection to a DC power supply represented by the symbol $V_{DC}$. Although not specifically depicted in FIG. 1, it should be understood that this point of the operational amplifier is connected to a suitable source of DC voltage, such as another full-wave rectifier connected across the secondary winding 12 of the transformer T1. Such a rectifier will be discussed below and is illustrated in FIG. 2. The operational amplifier U1 is also shown connected to a reference common.

As discussed above, the primary function of the present invention is to transmit and receive signals to enable a device, such as a microprocessor 20, to communicate through a series of power lines to another device. The microprocessor 20 would be connected to the present invention in such a way so as to permit the microprocessor 20 to receive signals, transmit signals and control the switch 18 by affecting the voltage across the relay coil K1. Disposed between the microprocessor 20 and the present invention is a means for multiplexing and filtering the input and output signals. This communication circuitry 30 will be specifically discussed below and is illustrated in more detail in FIG. 3. The microprocessor 20, through circuitry 30, would be connected to the present invention at point P3 for purposes of transmitting signals to the present invention for transmission to the power line 14. This transmitted signal would be sent from the microprocessor 20 and circuitry 30, through resistor R1 and to the amplifier components of the present invention. This signal, which could be observed between point P3 and resistor R1, would be a sinusoidal waveform modulated to represent digital data.

The microprocessor 20 would receive signals through circuitry 30 at point P4 on the line which is connected between resistor R14 and Zener diodes, D8 and D9. The signal which the circuitry 30 would receive at point P4 is theoretically a low-voltage modulated sinusoid. However, it should be understood that, in practice, this signal would actually be a combination of carrier signal and electrical noise and interference which would normally be expected when carrier signals are transmitted along power lines 14.

The portion of the circuit illustrated in FIG. 1, which comprises resistors R11 and R12 along with capacitor C5, provides a DC bias that enables transistor Q1 to be driven when it is essentially saturated. The cathode of capacitor C5 is connected, as shown, to the emitter of transistor Q1. The positive terminal of capacitor C5, when transistor Q1 is turned on, would be at approximately 20–30 volts DC. Capacitor C5, therefore, provides a floating power supply that permits transistor Q1 to be driven in saturation.

Resistor R9 controls the collector base cutoff current for transistor Q3. Because of potential temperature fluctuations, transistor Q3 could possible experience current leakages which would potentially lead to thermal instability. Therefore, resistor R9 is utilized in the circuit of the present invention as a base-emitter leakage control. Resistor R8 is utilized in the present invention as a base driver resistor for transistor Q3 in order to limit the output current of the operational amplifier U1. Capacitor C4 provides minor loop stabilization for transistor Q3.

In order to more clearly explain the operation of the present invention, the circuit of FIG. 1 has further been divided into functional groups. These functional groups are enclosed within dashed lines which are labeled PS, AMP, RL and RI. The DC power supply PS comprises the transformer T1 and the full wave rectifier 16. Its function is to convert the AC power line current the DC current for use by the DC circuit of the present invention. The amplifier AMP of the present invention comprises the operational amplifier U1, the transistors Q1-Q3 and related components. The relay RL permits the switch 18 to be controlled by an external device such as the circuitry 30. The receiver input RI includes resistors R13 and R14 along with diodes D8 and D9. These functional groups of components make up the basic circuit of the present invention.

FIG. 2 illustrates a particular embodiment of the present invention in which the components are particularly chosen and arranged for a specific application on a printed circuit board 21 which is illustrated as a dashed line in FIG. 2. Throughout the description of the preferred embodiment, like reference numerals will be used to describe like components appearing in the Figures. It should be understood that, although FIGS. 1 and 2 are not exactly identical to each other, they represent two similar embodiments of the present invention. FIG. 1 illustrates a conceptual circuit illustrating the operation of the present invention, whereas FIG. 2 represents a specific circuit drawing from which a particular embodiment of the present invention could be manufactured.

Some minor distinctions can be noted between FIGS. 1 and 2. These differences represent changes which were determined to be advantageous for purposes of simplifying the manufacture of the present invention and increasing its reliability. For example, resistors R13 and R14 are shown connected in a slightly different relationship with switch 18. This change reduces noise sensitivity in the overall circuit of the present invention by having these resistors connected to capacitor C6 at all times rather than just when the switch 18 is in the receive (Rx) mode. It is recognized that, in the circuit shown in FIG. 2, resistor R13 is connected in such a way so as to always experience the transmitter's power. However, in this particular embodiment of the present invention, it was determined that the resistor's contributions in damping oscillations was significantly advantageous and outweighed these other considerations.

It will also be noted that resistor R11, which is shown as a single resistor in FIG. 1, has been functionally replaced by two parallel resistors, R15 and R16, in FIG. 2. This change is made because of power capability considerations and, because of the choice of the resistor values, has essentially no operational affect in the circuit of the present invention.

Also, in FIG. 2, Zener diodes D15 and D16 have been added in order to limit the voltage input to the operational amplifier U1 which results from voltage across inductor L1. During transient conditions, such as an electrical storm, large voltage potentials of short duration can occur across inductor L1. To limit the magnitude of these voltage transients to the amplifier, Zener diodes D15 and D16 have therefore been connected as shown.

Also, a metal oxide varistor RV1 has been added to the circuit illustrated in FIG. 2 and is shown connected in parallel with capacitor C6. This component is capable of dissipating large amounts of energy and acts essentially similar to a Zener diode with significant power capabilities.

In the discussion above, the DC voltage power supply for operational amplifier U1 (referred to as $V_{DC}$ in FIG. 1) was not described in detail. In FIG. 2, this DC voltage, required by operational amplifier U1, is provided by a full-wave rectifier 22 which comprises diodes D10, D11, D12 and D13, connected as shown in a conventional full-wave-rectifier arrangement. The rectifier circuit 22 provides a DC voltage of 12 volts across capacitor C7 which is utilized both as a power supply for the operational amplifier U1 and as power for operation of the relay coil K1 which operates switch 18 in response to the actions of a microprocessor (reference numeral 20 in FIG. 1) which is not shown in FIG. 2. The full wave rectifier circuit 22, although not illustrated as being connected directly to any transformer, would be connected to a secondary winding of transformer T1 with points P9 and P10 being connected across that transformer's secondary winding.

Points P5 and P6 are shown to the right side of FIG. 2 as pins on a printed circuit board. These points, P5 and P6, would be operatively connected to a microprocessor or equivalent device through communication circuitry (reference numeral 30 in FIG. 1). That device would control the operation of the relay coil K1 and be capable of causing switch 18 to assume either the receive (Rx) or transmit (Tx) position.

Operatively connected to the relay coil K1, are diode D14 and resistor R21. The function of these components is to take the operational amplifier off-line when the relay is open. The function of transistor Q4 is to provide sufficient amplification to switch on the relay coil K1. The signal to the base of transistor Q4 originates from the microprocessor, or similar device, through point P6 and resistor R20. The transistor Q4, and its related resistor, R19 and R20, provide additional buffering between the microprocessor 20 and the relay coil K1. It should further be understood that, when the microprocessor 20, by virtue of its functional connection to point P6, turns transistor Q4 off, the voltage at the anode of diode D14 goes high along with the collector of transistor Q4.

In FIG. 2, transistors Q1 and Q2 are illustrated as Darlington pairs, or Darlington amplifiers, which each comprising two individual transistors associated with their collectors connected. It should be understood that transistors Q1 and Q2, although illustrated as Darlington pairs in FIG. 2, could alternatively be individual transistors as illustrated in FIG. 1.

Connected to the DC power supply for the operational amplifier U1 is a capacitor C8. This capacitor acts as a noise capacitor to permit high frequency noise to bypass the operational amplifier U1. This capacitor is connected to the line from which the DC voltages of approximately 12 volts, is provided from the full-wave rectifier circuit 22. As discussed above, this DC voltage power supply also provides the voltage to permit the operation of the relay coil K1 by an external device, such as the microprocessor 20, which would accomplish this function by affecting the voltage across points P5 and P6.

FIG. 2 also illustrates some components, which are used for receiver filtering, that were not shown in FIG. 1. This filtering network comprises resistors R17 and R18, capacitors C9 and C10 and inductor L2. This portion of the circuit operates as a high-pass filter which permits the passage of the carrier signal through it, but removes essentially all lower frequencies, such as the 60 Hz power line frequency.

Resistor R22 is shown in FIG. 2 connected in parallel with capacitor C3. This resistor had not been illustrated in the basic concept discussed above in relation to FIG. 1. Resistor 22 is used in FIG. 2 to further limit the DC gain of the system. It provides additional trimming to the stabilization which is provided by the minor loop.

The inputs and outputs from the printed circuit board 20 will be summarized herein in order to provide a better understanding of the present invention. Points P1 and P2 would be connected across the primary of the transformer T1. It should be understood that the voltage potential across these points is equivalent to approximately 240 volts AC and would typically represent the power line voltage extending from a distribution transformer (reference numeral T2 in FIG. 1), on the utility pole in front of a residence, to the electric meter of that residence. Point P3 would be connected to communication circuitry 30 for purposes of permitting the microprocessor 20 to send a modulated signal to the present invention for the purposes of transmitting that signal on the power line (reference numeral 14 in FIG. 1). Point P4 is the point where the present invention would be connected to communication circuitry 30 for purposes of sending a modulated signal to the microprocessor 20 which was received by the present invention from the power line (reference numeral 14 in FIG. 1). Points P5 and P6 would be also connected to a microprocessor 20 or an intermediate device, such as communications circuitry (reference numeral 30 in FIG. 1), for purposes of permitting that device to change the status of switch 18 from the receive (Rx) to the transmit (Tx) mode or vice versa. Points P7 and P8 are connected across the secondary winding 12 of the transformer T1. Similarly, points P9 and P10 would be connected across another secondary winding of transformer T1 or, alternatively, the secondary winding of another transformer. Point P11 would be connected to a suitable ground connection external to the printed circuit board 20.

The particular values of the components illustrated in FIGS. 1, 2 and 3 which were used in a preferred embodiment of the present invention are listed in TABLE I below.

TABLE I

| COMPONENT | VALUE |
|---|---|
| D1 | TYPE 1N5406 |
| D2 | TYPE 1N5406 |
| D3 | TYPE 1N5406 |
| D4 | TYPE 1N5406 |
| D5 | TYPE 1N4001 |
| D6 | TYPE 1N4001 |
| D7 | TYPE 1N4004 |
| D8 | TYPE 1N750 |
| D9 | TYPE 1N750 |
| D10 | TYPE 1N4004 |
| D11 | TYPE 1N4004 |
| D12 | TYPE 1N4004 |
| D13 | TYPE 1N4004 |
| D14 | TYPE 1N4148 |
| D15 | TYPE 1N758 |
| D16 | TYPE 1N758 |
| D18 | TYPE 1N4148 |
| D19 | TYPE 1N4148 |
| R1 | 3.3 K$\Omega$ |
| R2 | 13 K$\Omega$ |
| R3 | 11 K$\Omega$ |
| R4 | 150 K$\Omega$ |
| R5 | 5.1 K$\Omega$ |
| R6 | 200 K$\Omega$ |
| R7 | 110 K$\Omega$ |
| R8 | 3.3 K$\Omega$ |
| R9 | 2 K$\Omega$ |
| R10 | 47 $\Omega$ |
| R11 | 9 K$\Omega$ |
| R12 | 2.2 K$\Omega$ |
| R13 | 100 $\Omega$ |
| R14 | 1 K$\Omega$ |
| R15 | 20 L$\Omega$ |
| R16 | 20 K$\Omega$ |
| R17 | 200 $\Omega$ |
| R18 | 510 $\Omega$ |
| R19 | 10 K$\Omega$ |
| R20 | 3.3 K$\Omega$ |
| R21 | 10 K$\Omega$ |
| R22 | 100 K$\Omega$ |
| R23 | 4.7 K$\Omega$ |
| R24 | 1 M$\Omega$ |
| R25 | 200 $\Omega$ |
| R26 | 1 K$\Omega$ |
| R27 | 500 $\Omega$ |
| R28 | 1 K$\Omega$ |
| R29 | 500 $\Omega$ |
| RV1 | TYPE V300LA4 |
| Q1 | TYPE TIP102 |
| Q2 | TYPE TIP107 |
| Q3 | TYPE TIP47 |
| Q4 | TYPE 2N6427 |
| U1 | TYPE 3140 |
| L1 | 300 $\mu$H |
| L2 | 4.7 mH |
| L3 | 23.8 mH |

TABLE I-continued

| COMPONENT | VALUE |
| --- | --- |
| L4 | 23.8 mH |
| C1 | 350 µf |
| C2 | .047 µf |
| C3 | 100 pf |
| C4 | 270 pf |
| C5 | .47 µf |
| C6 | .57 µf |
| C7 | 2200 µf |
| C8 | .1 µf |
| C9 | .047 µf |
| C10 | .01 µf |
| C11 | 4700 pf |
| C12 | 6800 pf |
| C13 | .01 µf |
| C15 | .047 µf |
| C16 | 6800 pf |

Figure 3:
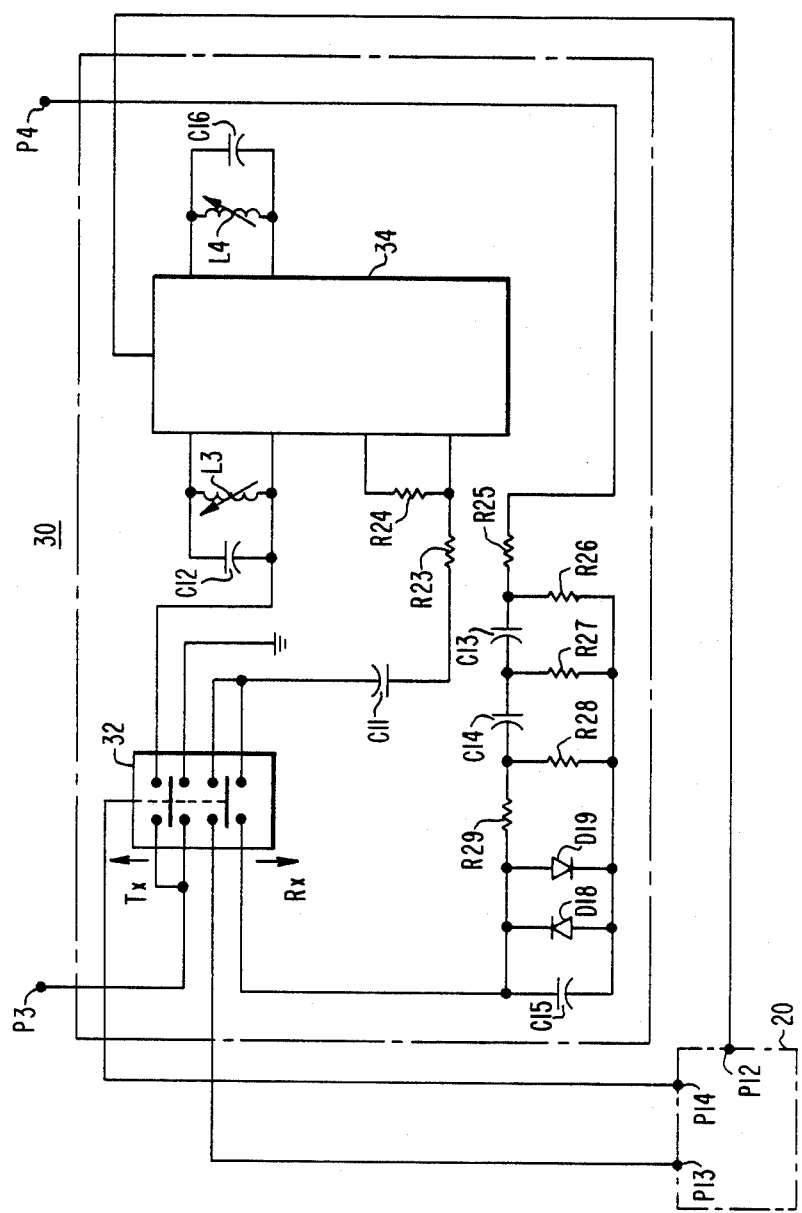
FIG. 3 illustrates the communications circuitry of FIG. 1.

The communication circuitry 30, which is shown in FIG. 1, is illustrated in more detail in FIG. 3. The circuitry 30 is intended to act as an input and output filter for the signals which are passed between the microprocessor 20 and the transceiver of the present invention. The communication circuitry 30 is also intended to act as a multiplexer for the input and output signals during the transmitting and receiving modes of operation of the present invention.

The communications circuitry 30 incorporates an analog multiplexer 32 which would be controlled by the microprocessor, at point P14, and would enable the microprocessor 20, or a similar control device, to switch the communications circuitry 30 from a transmit (Tx) to a receive (Rx) mode or vice versa. The IC chip 34 is a multistage filter which takes the input and provides the fundamental sinusoidal output at the selected frequencies determined by inductors L3 and L4 along with capacitors C12 and C16. During the transmit operation (Tx), the input to IC chip 34 is a square wave and during the receive operation (Rx), the input signal to the IC chip 34 is a modulated signal along with electrical noise.

As can be seen from the illustration in FIG. 3, when the analog multiplexer 32 is placed in a transmit (Tx) mode, the microprocessor 20 is operatively connected to the integrated circuit 34 in such a way that it can send a square wave modulated signal from point P13 through the analog multiplexer 32 to the integrated circuit 34 through the portion of the circuit comprising capacitor C11 and resistors, R23 and R24. The square wave modulated signal is then transformed into a sinusoidal signal which leaves the integrated circuit 34 and passes through the portion of the circuit comprising capacitor C12 and adjustable inductor L3. This sinusoidal signal then passes through the analog multiplexer 32 to point P3 which is connected electrically to the transmitter input portion of the present invention. The point P3 in FIG. 3 is the same point which is illustrated, as point P3, in FIGS. 1 and 2 as being connected to one terminal of resistor R1.

In order to more clearly illustrate the operation of the communications circuitry 30 which is shown in FIG. 3, the analog multiplexer 32 is depicted with directional arrows Tx and Rx. These directional arrows represent the functional positions of the analog multiplexer 32 which are schematically illustrated as movable contacts in FIG. 3. However, it should be clearly understood that the analog multiplexer 32 would most likely comprise a solid state component with no moving parts. Therefore, the directional arrows, Tx and Rx, are for illustration purposes only and are not to be interpreted as indicating the requirement of a movable switch.

When the present invention is operating in the receiving mode (Rx), the sinusoidal signal which is received by the present invention is sent to the communications circuit 30 through point P4. This modulated sinusoidal signal then passes through the portion of the circuitry which comprises resistors R25–R29, capacitors C13–C15 and diodes D18 and D19. This sinusoidal signal then passes through the analog multiplexer 32, through the portion of the circuit comprising capacitor C11 and resistors R22 and R24 and into the integrated circuit 34. From the integrated circuit 34, the sinusoidal signal which had been received by the receiver circuitry of the present invention, then passes to point P12 of the microprocessor 20 wherein it would be demodulated in order that electrical noise and spurious signals could be removed from the carrier and a resulting square wave modulated signal could properly be interpreted by the microprocessor 20.

In summary, the analog multiplexer 32 operates to switch the communications circuitry 30 from the transmit (Tx) to the receive (Rx) mode and vice versa. When in the transmit (Tx) mode, point P3 is operatively connected to the portion of the circuit comprising capacitor C12 and point P13 is operatively connected to the portion of the circuit comprising capacitor C11. Alternatively, when in the receive (Rx) mode, the portion of the circuit comprising capacitor C15 is operatively connected to the portion of the circuit comprising capacitor C11 and point P3 is connected to ground. The communications circuitry 30 which is illustrated in FIG. 3 provides appropriate switching and filtering for the input and output signals which pass between the microprocessor 20 and the transceiver of the present invention which is illustrated in FIGS. 1 and 2. It should be understood that, although the circuitry in FIG. 3 is illustrated in a particular embodiment, other alternative embodiments could be used and should be considered to be within the scope of the present invention.

OPERATION OF THE PRESENT INVENTION DURING TRANSMISSION

The operation of the present invention during transmission of modulated carrier signals can best be understood with reference to FIG. 1. A front end signal, which is sinusoidal, is provided at point P3 of the present invention as an input to the operational amplifier U1 which is part of the linear amplifier of the present invention. That sinusoidal signal is generated by filtering, at a low power level, the output from the microprocessor 20. This filtering operation is performed by the communications circuitry 30. The sinusoidal input to the present invention at P3 originated as a square wave modulated signal which is produced by the microprocessor 20 and filtered by the communications circuitry 30. The modulated signal could typically be any value from 5 to 20 kHz depending on the particular application, and is typically about 12.5 kHz.

When the present invention is used as a transmitter, switch 18 would be commanded to assume position Tx by some external device such as the microprocessor 20. This position of switch 18 couples the output of the linear amplifier through the two filtering components, capacitor C6 and inductor L1. The output signal would pass through capacitor C6 to the primary side of the transformer T1 at point P1. The signal would pass through the load, which is the primary winding of the transformer T2, and back through point P2 and inductor L1 to form the interconnection for transmitting. As can be seen in FIG. 1, the output from the operational amplifier U1 and transistors Q1-Q3, which cooperate to form the linear amplifier of the present invention, is connected directly to the 240 volt AC power line.

The linear amplifier output is a constant voltage which is essentially the input voltage multiplied by the gain of the linear amplifier. As discussed above, the operational amplifier U1 is provided with both voltage and current feedback in such a way that, when current is flowing, an adjustment is made which results in a constant input voltage for the operational amplifier U1. Voltage feedback is provided through resistor R7 and current feedback is provided through resistor R4 from the inductor L1. The combination of these two feedbacks maintains a generally constant output power from the operational amplifier U1. Table II contains exemplary empirical values for the output power of the amplifier for various values of DC voltage supply and transmission output voltage at various load impedances. As can be seen from Table II, a relatively large change in load impedance results in a much less significant change in the output power of the linear amplifier.

OPERATION OF THE PRESENT INVENTION IN THE RECEIVING MODE

Again referring to FIG. 1, the present invention is utilized in the receiving mode with switch 18 placed in the Rx position. As discussed above, switch 18 is controlled by some external device such as the microprocessor 20.

With switch 18 in the Rx position, filtering components C6 and L1 are utilized for the receiver and resistors R13 and R14, along with diodes D8 and D9, provide a burden to the input signal and provide protective limiting for voltage impulses that could occur on the power line 14.

The signal that is received, which in practice would be a sinusoidal carrier signal and 60 Hz signal along with varying amounts of electrical noise, is then made available, at point P4, to a microprocessor 20 and its associated communications circuitry 30.

TABLE II

| Load Impedance | Phase Angle | DC Supply Voltage | Tx Output Voltage | Output Power |
| --- | --- | --- | --- | --- |
| 50 ohms | 5° | 75 volts | 70 volts | 9.6 watts |
| 15 ohms | 50° | 65 volts | 50 volts | 13.0 watts |
| 12 ohms | 60° | 63 volts | 47 volts | 12.0 watts |
| 7.6 ohms | 50° | 58 volts | 42 volts | 19.0 watts |
| 5.8 ohms | 60° | 55 volts | 35 volts | 14.0 watts |
| 2.6 ohms | 45° | 47 volts | 25 volts | 21.0 watts |

ADVANTAGES OF THE PRESENT INVENTION

The present invention provides a transceiver which utilizes common components, namely capacitor C6 and inductor L1, for both receiving and transmitting. It also avoids the need for output transformers which would normally be utilized to isolate the transceiver from the power line. As discussed in detail above, the present invention also provides a relatively constant output from its linear amplifier regardless of the impedance of the load. It accomplishes this relatively constant output by utilizing both current and voltage feedback for its operational amplifier and the output of the present invention is connected directly to the power line instead of being isolated from it.

The preferred embodiment of the present invention has been described with considerable specificity and illustrated in significant detail. However, it should be understood that this particular embodiment has been described for purposes of illustrating the operation and advantages of the present invention and not for purposes of limiting its scope. Similar apparatus, employing alternative components and configurations, should be considered to be within the scope of the present invention.

What I claim is:

1. Apparatus for transmitting and receiving carrier signals in communication with a power line, comprising:
   means for amplifying a modulated signal and producing an amplified output signal;
   means for electrically filtering said output signal, said filtering means being electrically connected to a burden which is connectable in electrical communication with said power line;
   means for providing said burden for an incoming signal from said power line;
   switching means having a first position for directly connecting said burden in electrical communication with said power line and a second position for disconnecting said burden from electrical communication with said filtering means;
   means for providing a voltage feedback for said amplifying means; and,
   means for providing a current feedback for said amplifying means.

2. The apparatus of claim 1, wherein:
   said amplifying means comprises an operational amplifier, said operational amplifier being cooperatively associated with a plurality of transistors.

3. The apparatus of claim 2, wherein:
   one of said transistors comprises a Darlington amplifier.

4. The apparatus of claim 1, wherein:
   said filtering means comprises a capacitor and an inductor.

5. A carrier signal transceiver, comprising:
   an operational amplifier having its noninverting input being connectable to a signal source;
   a plurality of transistors cooperatively associated with said operational amplifier to form a linear amplifier, the output of said linear amplifier being directly connectable to a power line;
   first means for providing a voltage feedback circuit for said operational amplifier;
   second means for providing a current feedback circuit for said operational amplifier;
   an electrical filter connectable between said linear amplifier and said power line, said electrical filter comprising a capacitor and an inductor;
   a burden component electrically connectable with said power line between said capacitor and said inductor; and
   means for connecting and disconnecting said burden component and said power line.

6. The transceiver of claim 5, wherein:
   one of said transistors comprises a pair of transistors connected as a Darlington pair.

7. An apparatus for transmitting and receiving a power line carrier signal, comprising:

first and second terminals, said first and second terminals being connectable with said power line at points of different voltage potential;

an operational amplifier having an output, a noninverting input and an inverting input, said noninverting input being electrically connectable to said first terminal;

a first transistor having its emitter electrically connected to said noninverting input of said operational amplifier;

a second transistor having its emitter electrically connected to said noninverting input of said operational amplifier and to said emitter of said first transistor;

a third transistor having its collector electrically connected to the base of said second transistor and having its base electrically connected to said output of said operational amplifier;

a voltage feedback circuit electrically connected between said noninverting input and said output of said operational amplifier;

a current feedback circuit electrically connected between said noninverting input and said output of said operational amplifier;

a capacitor being electrically connectable between said first terminal and said noninverting input of said operational amplifier;

an inductor being electrically connected between said second terminal and said noninverting input of said operational amplifier;

a burden being connectable between said capacitor and said inductor;

means for electrically connecting said first terminal to said emitters of said first and second transistors;

a third terminal connected to said burden, said third terminal being connectable to an external device for sending a received signal to said external device;

a fourth terminal connected to said noninverting input of said operational amplifier, said fourth terminal being connectable to an external device for receiving a signal to be transmitted to said power line.

8. The apparatus of claim 7, wherein:
said voltage feedback circuit comprises a first resistor which is electrically connected between said noninverting input of said operational amplifier and said emitters of said first and second transistors.

9. The apparatus of claim 7, wherein:
said current feedback circuit comprises a second resistor which is electrically connected between said noninverting input of said operational amplifier and said second terminal.

10. A method for transmitting signals to a power line and receiving signals from a power line, comprising:

providing a first and a second terminal, said first and second terminals being connectable to points of different voltage potential within said power line;

providing an operational amplifier having an output, a noninverting input and an inverting input;

associating a plurality of transistors cooperatively with said operational amplifier to form a linear amplifier;

connecting a capacitive component to said first terminal, said capacitive component being connectable in electrical communication between said first terminal and said noninverting input;

connecting together the emitters of a preselected two of said plurality of transistors;

connecting said emitters with said noninverting input;

providing a means for connecting said emitters with said capacitive component;

providing an inductive component in electrical connection with said second terminal;

providing a burden between said capacitive and inductive component;

providing a voltage feedback from said output to said noninverting input of said operational amplifier; and providing a current feedback from said output to said positive input of said operational amplifier, said current feedback passing through said indicative component.

11. A power line carrier signal transceiver, comprising:

a linear amplifier circuit comprising an operational amplifier which is cooperatively associated with a plurality of transistors, the output of said linear amplifier being connectable between a first point and a second point of said power line having a voltage potential therebetween;

means for providing a voltage feedback for said operational amplifier;

means for providing a current feedback for said operational amplifier;

a filter network comprising a capacitor and an inductor, said inductor being electrically connected with said second point, said capacitor being electrical to said first point, said capacitor being electrically connectable with the output of said linear amplifier;

a burden which is electrically connectable between said capacitor and said inductor;

first means for connecting said burden to an external device, said first connecting means being electrically connected to said burden with said burden being disposed electrically between said first connecting means and said capacitor; and second means for connecting said linear amplifier to an external device, said second connecting means being connected in electrical communication with a non-inverting input of said operational amplifier.

* * * * *